United States Patent Office 2,749,348
Patented June 5, 1956

2,749,348

MAKING SUBSTITUTED PYRIDINES

John E. Mahan and Charles E. Stoops, Bartlesville, Okla., assignors to Phillips Petroleum Company, a corporation of Delaware No Drawing. Application January 3, 1952,
Serial No. 264,838

14 Claims. (Cl. 260—290)

This invention relates to a process for the production of substituted pyridines. In one aspect this invention relates to a process for the production of alkyl substituted pyridines by the catalytic condensation of aldehydes and ketones. In one specific embodiment this invention relates to a novel process for the production of 2-methyl-5-ethyl pyridine.

Pyridine homologs are useful as intermediate compounds in the production of pyridine derivatives containing unsaturated side chains, such as the vinyl pyridines which are capable of undergoing copolymerization with other unsaturated organic compounds, such as butadiene, to produce potentially useful synthetic rubbers. Vinyl pyridines can be prepared from pyridine homologs, such as 2-methyl-5-ethyl pyridine which is also known as aldehyde collidine and aldehydin, by various methods. For example, 2-methyl-5-ethyl pyridine may be reacted with formaldehyde to produce the monomethylol derivative which, upon dehydration, produces 2-vinyl-5-ethyl pyridine. Also, the ethyl group in 2-methyl-5-ethyl pyridine may be dehydrogenated to produce 2-methyl-5-vinyl pyridine.

The condensation of aldehydes and ketones, either saturated or unsaturated, and derivatives thereof with ammonia or its derivatives to form substituted pyridines is one of the oldest of organic reaction. See R. L. Frank et al, Journal of the American Chemical Society, 71, pages 2629 et seq. (August, 1949) and R. L. Frank et al, Journal of the American Chemical Society, 68, pages 1368–9 (July 1946). The condensation reactions have been effected non-catalytically, and ammonium acetate and alumina have been employed in the prior art as catalysts for the reaction. Also ammonium chloride has been reported as showing the same effect as ammonium acetate. However, the prior art methods have a poor reputation for commercial production because of the formation of mixtures of pyridines and various by-products. In addition, when operating according to the prior art, relatively low yields of individual products have usually been reported.

It is an object of this invention to provide a novel process for the production of substituted pyridines.

It is another object of this invention to provide a process for the production of substituted pyridines that eliminates certain difficulties in the prior art processes.

It is another object of this invention to condense aldehydes and ketones and their derivatives with ammonia in the presence of novel catalysts for the reaction.

It is another object of this invention to provide a novel process for the production of 2-methyl-5-ethyl pyridine from low-boiling aldehydes and ammonia.

It is a further object of this invention to employ novel catalysts for the condensation of low-boiling aldehydes and ammonia to produce 2-methyl-5-ethyl pyridine.

Further and additional objects of our invention will be apparent from the disclosure and description of our invention hereinbelow.

We have found that substituted pyridines can be produced by the improved method of reacting an organic aldehyde or ketone or derivative thereof with ammonia in the presence of sulfonic acids containing not more than 10 carbon atoms per molecule or salts thereof.

Throughout this disclosure we will refer to the aldehydes, ketones and derivatives thereof as carbonyl compounds. The carbonyl compounds, within the scope of our invention are known in the art, and illustrative examples of these compounds are set forth in detail in the above-named references. To produce 2-methyl-5-ethyl pyridine we prefer to use an aldehyde containing no more than six carbon atoms per molecule, such as acetaldehyde, crotonaldehyde, and paraldehyde. However, our invention is not limited in scope to the production of this particular pyridine derivative nor to the use of the specific aldehydes. For example, aldehydes and ketones, i. e. benzalacetophenone, benzaldiacetophenone, ethylidene acetone, p-chlorobenzaldiacetophenone, and anisaldiacetophenone, may be condensed with ammonia to form pyridine derivatives. In addition, mixture of aldehydes and ketones, for example benzaldehyde and acetophenone, benzaldiacetophenone and acetophenone, benzaldehyde and desoxybenzoin, benzalacetone and acetophenone, and benzalacetone and acetone, may be employed to form pyridine derivatives.

In preferred aspects our invention effects these syntheses in the presence of sulfonic acid catalysts having not more than 10 carbon atoms. Although not limited thereto the catalysts include the alkane, cycloalkane, aromatic, alkylaromatic, and arylalkane sulfonic acids having not more than ten carbon atoms per molecule, and the same substituted by non-interfering radicals. Also applicable are heterocyclic sulfonic acids, for example pyridine sulfonic acid, methylfuran sulfonic acid. Examples of suitable sulfonic acids to be employed as catalysts in accordance with our invention are: ethane, chloroethane, propane, isobutane, pentane, difluoropentane, cyclohexane, methylcyclopentane, toluene, xylene, phenylethane, phenyl-iso-butane sulfonic acids. Presumably when the free acid is used a corresponding ammonium salt is formed in the reaction mixture. The ammonium salt can be added in the first instance, rather than the free acid. Salts of the sulfonic acids with organic bases are also suitable. For example salts of any of the sulfonic acids with amines, either primary, secondary or tertiary and either alkyl, cycloalkyl, aromatic, or heterocyclic, for example trimethylamine, butylamine, sec-hexylamine, pyridine, aniline, can be employed as catalysts of the invention.

The preferred catalysts are the sulfonic acids containing no more than 10 carbon atoms per molecule and salts thereof with nitrogen-containing bases. However, metal salts of the said sulfonic acids which have sufficient solubility and provide in the reaction mixture adequate catalytic effect can also be used, for example alkali metal, alkaline earth metal, cobalt, titanium, aluminum salts.

Although it is not essential to the course of the reaction, we have found it preferable to employ the catalysts in relatively small amounts. Usually from 0.05 to 10, preferably, 0.1 to 6 weight per cent of the catalyst based on the carbonyl compound is employed.

Mol ratios of ammonia to carbonyl compound undergoing condensation within the range of 1:1 to 12:1 are utilized, but higher ratios are operable in our process. We prefer to use mol ratios of ammonia to carbonyl compound within the range of 2:1 to 9:1 in order to maintain the volume of material to be handled at a low level.

The ammonia for the reaction is usually in an aqueous solution, but in some instances it may be desirable to conduct the reaction with anhydrous liquid ammonia. When an aqueous ammonia solution is utilized for the reaction, ammonia and water are ordinarily supplied to the reactor in a ratio such that a water-ammonia solution containing 10 to 90 weight per cent ammonia is formed; 25 to 50 weight per cent ammonia is usually preferred.

Optimum reaction temperatures are within the range of 300 to 650° F., preferably 450 to 550° F. The reaction is usually effected in the liquid phase, and, consequently, pressures at least sufficient to maintain the reaction mixture in liquid phase are employed. When operating with a closed pressure reactor, the autogenous pressures developed by the reaction mixture at the reaction temperature are satisfactory. These pressures are usually within the range of 850 to 2500 pounds per square inch gauge. The reaction period, or the time during which the reaction mixture is maintained at the desired reaction temperature, may vary from 3 minutes to 5 hours, preferably no longer than 2 hours. However, good yields of substituted pyridines can be obtained by cooling the reaction mixture, such as by quenching in ice water, as soon as the desired reaction temperature is attained in a batch reaction. It is also desirable to cool the reaction mixture rapidly, such as by quenching in ice water, after the desired reaction period has expired. In this manner improved yields are obtained over procedures wherein the reaction mixture is allowed to cool slowly after expiration of the reaction period. Reaction periods longer than 2 hours may be used, but they are not essential to the process. Little, if any, advantage is gained by so operating, and, actually, the longer reaction periods may be conducive toward decomposition of the reaction products, resulting in decreased yields of the desired substituted pyridines. At the end of the desired reaction period, the temperature is lowered to about room temperature, and the substituted pyridines are recovered from the reaction mixture by any suitable method, such as fractional distillation.

In some instances it may be found desirable to employ an emulsifying agent in the reaction mixture. It is preferred that any emulsifying agent so employed be soluble in at least one of the components of the reaction mixture. Emulsifying agents that may be used include salts of saturated or unsaturated fatty acids containing at least six and not more than 18 carbon atoms, sulfates, such as lauryl sulfate, sulfonates, such as alkaryl sulfonates. Nonionic detergents, such as products obtained by condensation of ethylene oxide with organic acids, alcohols, mercaptans, phenols, amides, and the like, as well as cationic surface active agents of the quaternary ammonium ion type, may also be used.

Although we have described our invention as a batch process, the invention can also be practiced in a continuous operation, and such operation is within the scope of our invention. In one embodiment of a continuous process, reactants are introduced continuously to a suitable pressure reactor from which a portion of the reaction mixture is withdrawn continuously. Reaction products are separated therefrom, and unchanged reactants are then recycled to the reactor.

*Example*

The example hereinbelow is illustrative of one preferred embodiment of our invention. In these runs a stainless steel bomb was employed as the reactor. The bomb was provided with a thermometer well, and the bomb was wrapped with resistance wire and thus heated electrically. In conducting the runs the bomb was charged with reactants, viz. paraldehyde and aqueous ammonia plus ethane sulfonic acid as catalysts in run B, and firmly sealed. Air was removed from the bomb by adding nitrogen to a pressure of one hundred pounds per square inch and venting until the pressure was again atmospheric. A period of one hour to one and one-half hours was required for the bomb to attain the desired reaction temperature, and the duration of the run was the interval of time that the bomb was held at the desired reaction temperature. Agitation of the bomb was provided by an electrically driven platform rocker.

Run A was made with no catalyst, while run B was made with 4.0 weight per cent ethane sulfonic acid based on paraldehyde charged.

| Run | A | B |
|---|---|---|
| Catalyst | None | Ethane Sulfonic Acid |
| Weight of catalyst, gms | | 6.8 |
| Paraldehyde, gms | 170 | 170 |
| Paraldehyde, mols | 1.286 | 1.286 |
| Ammonia, gms | 173 | 173 |
| Ammonia, mols | 10.17 | 10.17 |
| Mol ratio, ammonia/paraldehyde | 7.91 | 7.91 |
| Water, gms | 211 | 211 |
| Aqueous NH₃ Wt. Percent NH₃ | 45 | 45 |
| Duration of run, hours | 3.0 | 0.5 |
| Temperature, ° F | 490–500 | 490–500 |
| Per pass yield of 2-methyl-5-ethyl pyridine (mol percent of theoretical based on paraldehyde charged) | 59.0 | 68.0 |
| Per pass yield of picolines (mol percent of theoretical based on paraldehyde charged) | 4.5 | 3.1 |

In processes employed prior to our invention the pyridine derivatives were usually recovered from the reaction mixture by a steam distillation process. The reaction mixture, upon completion of the reaction, was acidified, and volatile non-basic compounds were removed by steam distillation. The non-volatile basic residue was made strongly basic to liberate organic bases, and the resulting mixture was steam distilled. The pyridine derivatives were then extracted from the resulting distillate. In our process, as a result of increased yields of pyridine derivatives when one of our catalysts is used in the reaction mixture and the attendant decrease in side reactions, we have found it possible to recover the pyridine derivatives from the reaction mixture by extraction with a suitable solvent. This represents a considerable improvement over prior art processes, and it is useful in the commercial operation of our process. The solvents in our process dissolve the pyridine derivatives but they are immiscible with water. Liquid hydrocarbons are suitable in our process. Aliphatic hydrocarbons can be used, but we prefer to use aromatic hydrocarbons, for example, benzene and toluene. Also, halogenated hydrocarbon derivatives that are liquid at room temperatures, for example, chloroform, are also suitable for use in our process. After extraction of the pyridine derivatives from the reaction mixture with a solvent, such as benzene, the pyridine derivatives are readily separated from the solvent by a process such as fractional distillation and the like.

From the above disclosure numerous modifications of our process will be apparent to those skilled in the art.

We claim:

1. The process for preparing alkyl substituted pyridines which comprises contacting a carbonyl compound of 1 to 6 carbon atoms per molecule selected from the group consisting of aldehydes and ketones with ammonia at a temperature in the range of 300° to 600° F. and at a pressure sufficient to maintain the reaction mixture in liquid phase, in a reaction mixture to which has been added a catalyst comprising sulfonic acids containing not more than 10 carbon atoms per molecule and being selected from the group consisting of alkane, cycloalkane, aromatic, alkylaromatic, arylalkane and pyridine sulfonic acids and salts thereof with nitrogen containing bases.

2. The process of claim 1 wherein the catalyst is an aliphatic sulfonic acid.

3. The process according to claim 1 wherein the catalyst is pyridine salt of ethane sulfonic acid.

4. In a process for producing alkyl substituted pyridines by the interaction of a low-boiling aldehyde with ammonia, the improvement which comprises effecting the reaction in a reaction mixture to which has been added catalytic amounts of ethane sulfonic acid.

5. The process for preparing 2-methyl-5-ethyl pyridine which comprises contacting paraldehyde with ammonia at a temperature within the range of 300 to 650° F. and at a pressure sufficient to maintain the reaction mixture in liquid phase, in a reaction mixture to which has been added a catalyst selected from the group consisting of alkane sulfonic acids containing not more than 10 carbon atoms per molecule and salts thereof with nitrogen-containing bases.

6. The process for preparing 2-methyl-5-ethyl pyridine which comprises contacting paraldehyde with ammonia at a temperature within the range of 300 to 650° F. and at a pressure sufficient to maintain the reaction mixture in liquid phase, in a reaction mixture to which has been added ethane sulfonic acid.

7. A process according to claim 6 wherein the reaction period is within the range of 3 minutes to 5 hours.

8. A process according to claim 6 wherein from 0.05 to 10 weight per cent of ethane sulfonic acid based on paraldehyde is employed.

9. A process according to claim 6 wherein the ammonia and paraldehyde are employed in a molar ratio within the range of 1:1 to 12:1.

10. A process according to claim 6 wherein sufficient water is present in the reaction mixture to produce a solution with the reactant ammonia containing 10 to 90 weight per cent ammonia.

11. The process for preparing alkyl substituted pyridines which comprises contacting an aldehyde containing not more than 6 carbon atoms per molecule with ammonia at a temperature in the range of 300 to 600° F. in a reaction mixture to which has been added in catalytic amounts an alkane sulfonic acid containing not more than 10 carbon atoms per molecule.

12. The process for preparing alkyl substituted pyridines which comprises contacting a carbonyl compound of 1 to 6 carbon atoms per molecule selected from the group consisting of aldehydes and ketones with ammonia at a temperature in the range of 300 to 600° F. and at a pressure sufficient to maintain the reaction mixture in liquid phase, in a reaction mixture to which has been added a catalyst comprising an alkane sulfonic acid containing not more than 10 carbon atoms per molecule.

13. The process for preparing alkyl substituted pyridines which comprises contacting a carbonyl compound of 1 to 6 carbon atoms per molecule selected from the group consisting of aldehydes and ketones with ammonia at a temperature in the range of 300 to 600° F. and at a pressure sufficient to maintain the reaction mixture in liquid phase, in a reaction mixture to which has been added a catalyst consisting of ethane sulfonic acid.

14. The process for preparing alkyl substituted pyridines which comprises contacting a carbonyl compound of 1 to 6 carbon atoms per molecule selected from the group consisting of aldehydes and ketones with ammonia at a temperature in the range of 300 to 600° F. and at a pressure sufficient to maintain the reaction mixture in liquid phase, in a reaction mixture to which has been added a catalyst consisting of propane sulfonic acid.

References Cited in the file of this patent

UNITED STATES PATENTS 2,615,022    Mahan   ---------------- Oct. 21, 1952

FOREIGN PATENTS 521,891    France   ---------------- July 21, 1921

OTHER REFERENCES

Frank et al.: "Jour. Am. Chem. Soc." (July 1946), vol. 68, 1368–9.

Maier-Bode: "Das Pyridin und seine Derivate" (1934), pp. 56–57.